Nov. 22, 1955
R. L. FOWLER
2,724,597
PRESSURE VESSEL TRAILER
Filed Feb. 13, 1953
2 Sheets-Sheet 2
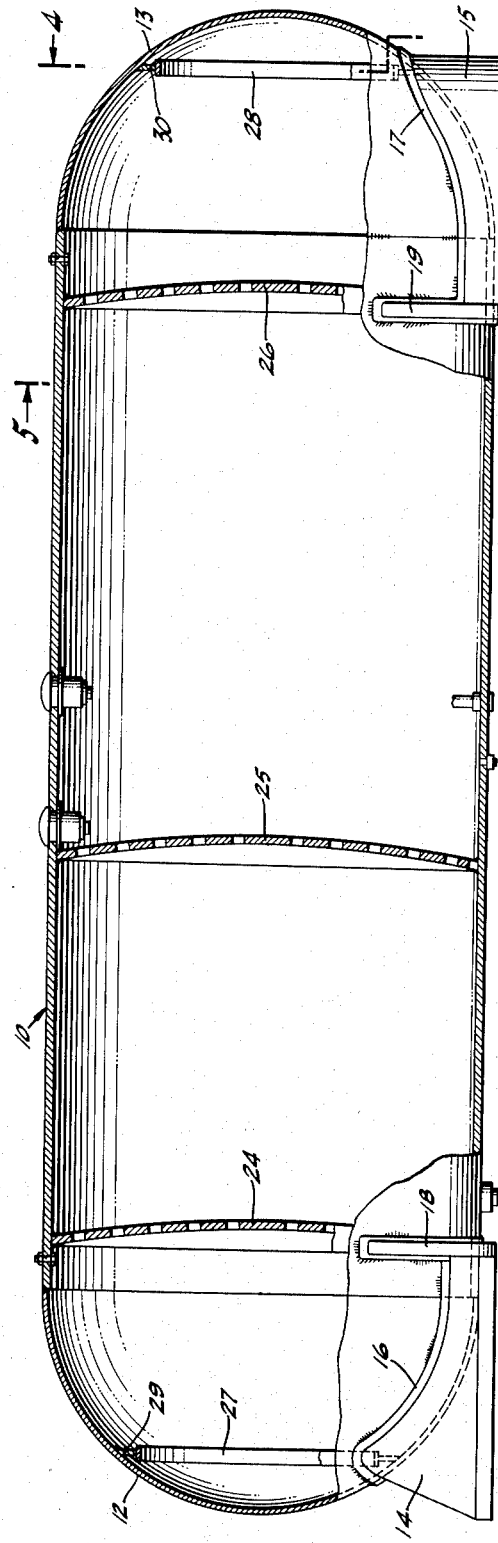
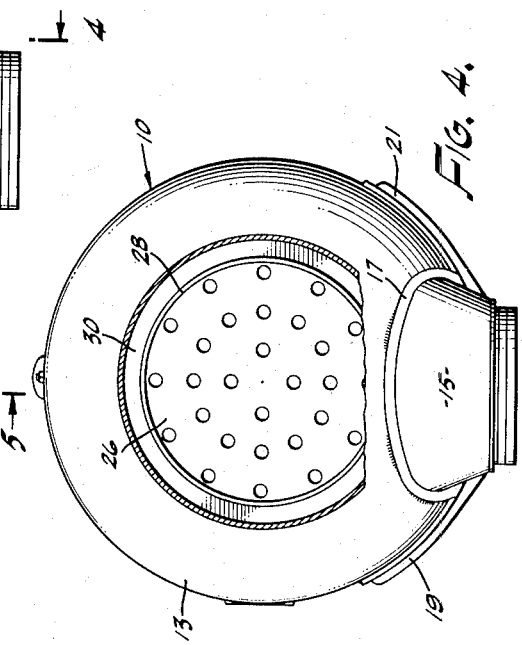
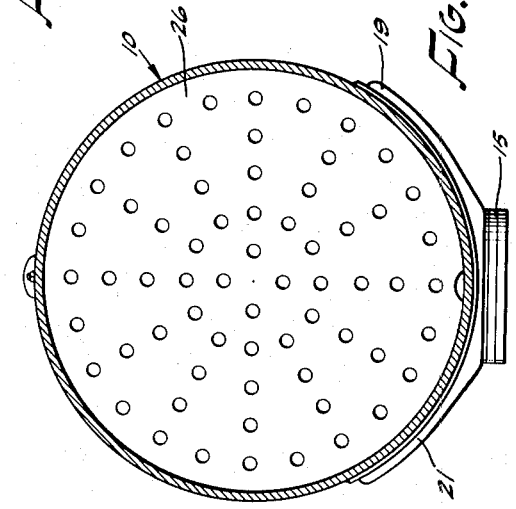
RALPH L. FOWLER
INVENTOR.
BY  Hazard & Miller
ATTORNEYS

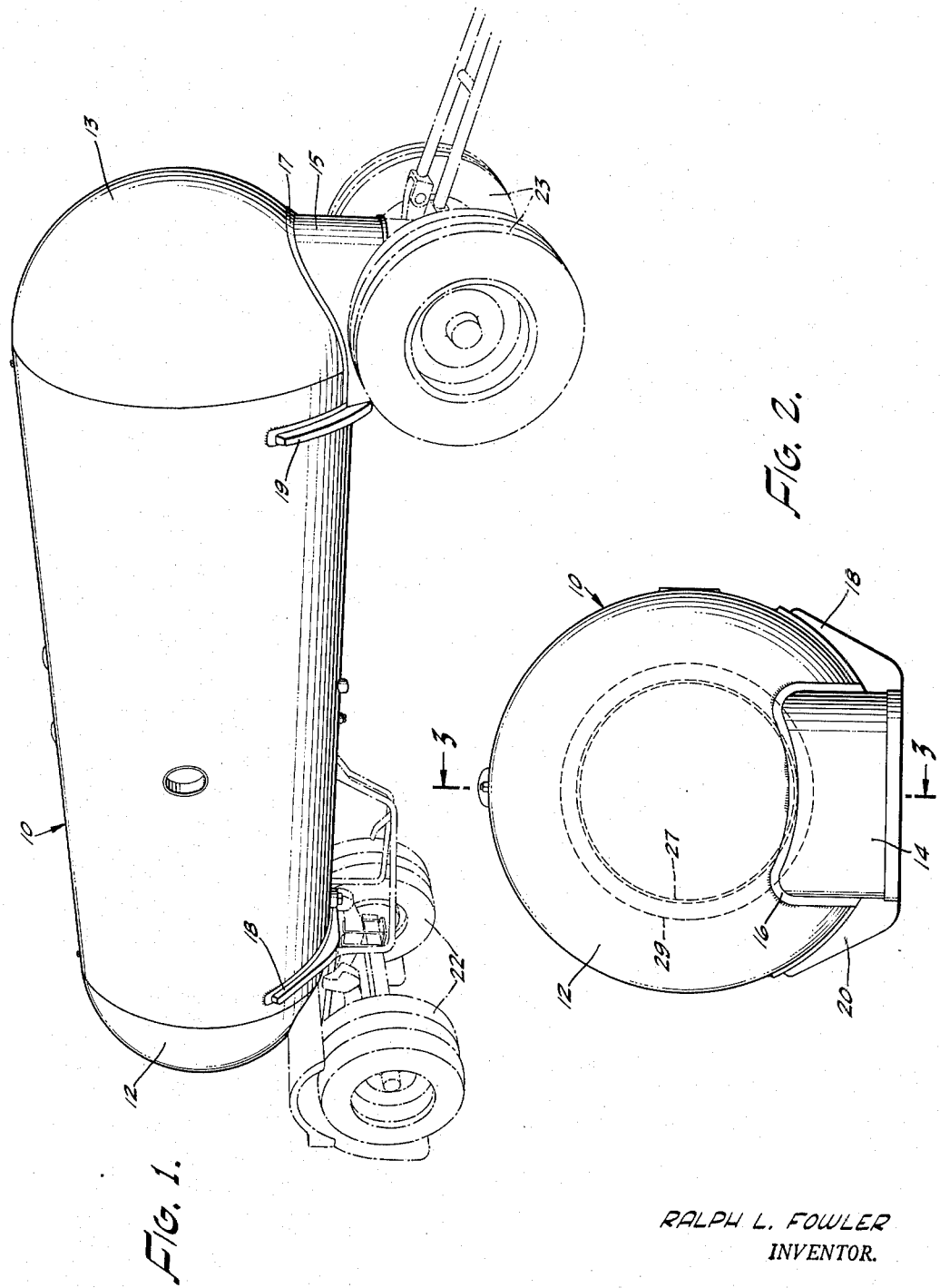

United States Patent Office 2,724,597
Patented Nov. 22, 1955

2,724,597
PRESSURE VESSEL TRAILER

Ralph L. Fowler, Los Angeles, Calif., assignor to Superior Tank & Construction Co., Los Angeles, Calif., a corporation of California Application February 13, 1953, Serial No. 336,660

3 Claims. (Cl. 280—5)

This invention relates to mobile pressure vessel trailer tanks for transporting liquids and the like.

Transportation by motor transport has been accomplished in the past by simply adding tanks to the frames of trucks and trailers, making simple protective devices over protruding fitting with little thought given to the design of a tank and trailer as an integral piece of transportation equipment. However, in the past few years there has been a trend in the motor transportation industry to manufacture and use tank trailers of all types that are integral units; that is, tank and axles are so attached that no separate trailer frames are used, the tank serving as the frame. The wheels, axles and spring are attached directly to the ends of the tank. This particular form of construction has been successfully accomplished in many instances for the hauling of chemicals, milk, gasoline, and other petroleum products. Therefore, the principal object of this invention is to provide a pressure vessel trailer or tank that serves at its own frame which is directly attached at the extreme ends to underlying mobile units, thereby eliminating, what has heretofore been a conventional frame, unnecessary weight, resulting in an increased payload.

Another object of this invention is to provide a tank shell that is circular in cross section and is retained in such configuration by the use of internally constructed baffles and girders.

Another important object of this invention is to provide a pressure vessel trailer tank that, as beforesaid, serves as its own frame, which has a lower center of gravity resulting in an increased safety factor.

A still yet further important object of this invention is to provide spaced subframes for the pressure vessel trailers that are welded directly to said trailers and not bolted, as has been the conventional method of construction in the past, the result constituting an integral unit which in turn eliminates frame bending at different periods of vibration and results in less damage to supporting members.

With the foregoing and other objects in view, which will be made manifest in the following detailed description and specifically pointed out in the appended claims, reference is had to the accompanying drawings for an illustrative embodiment of the invention, wherein:

Figure 1 is a fragmentary perspective view of this invention with certain features thereof illustrated in phantom lines;

Fig. 2 is an enlarged rear end view of this invention with certain internal structures indicated in dotted lines;

Fig. 3 is a fragmentary longitudinal cross sectional view taken on the line 3—3 of Fig. 2;

Fig. 4 is a fragmentary cross sectional view taken on the line 4—4 of Fig. 3; and Fig. 5 is a cross sectional view taken on the line 5—5 of Fig. 3 looking in the direction of the arrows.

Referring to the accompanying drawings wherein similar reference characters designate similar parts throughout, the tank trailer of this invention comprises a cylindrically shaped body broadly designated by the numeral 10, constructed from sheet steel or other equally applicable metal having a particular dimensional thickness. Body 10 is enclosed at each end by hemispherical heads 12 and 13, also constructed of sheet steel or equally applicable metal having a dimensional thickness less than that of the body 10. Supporting the body 10 are irregularly-shaped, spaced subframes 14 and 15 located at each extreme end of the body 10 respectively. Located between each subframe 14 and 15 and heads 12 and 13 of body 10 and welded thereto are metal pads 16 and 17. Extending upwardly about body 10 and partially embracing the same are arms 18, 19, 20 and 21 of subframes 14 and 15 and pads 16 and 17. These arms 18, 19, 20 and 21 are spaced from the extreme ends of body 10 and toward the center of the same. Underlying subframes 14 and 15 are wheels of mobile units shown in phantom lines 22 and 23. These particular units are conventional and as such do not comprise a portion of this invention.

Located within body 10 and spaced apart therein are flexible perforated baffles 24, 25 and 26 which are circular in shape. Baffles 24, 25 and 26 have, when not flexed as illustrated but when entirely flat, a diameter greater than that of body 10 and are welded thereto and by virtue of the increase in diameter over that of the body these same baffles flex in the direction of the flow or surge of liquid that may be carried by and within the body 10. This flexing of baffles 24, 25 and 26 retards the surging of liquids located within body 10 and tends to inhibit or restrict the strain that may be placed on the heads 12 and 13 in the absence of the aforementioned baffles 24, 25 and 26. Additionally, baffles 24, 25 and 26 form the circular structure about which cylindrical body 10 is constructed.

Baffles 24 and 26, respectively, lie in parallel planes and overlie arms 18 and 19, 20 and 21 of subframes 14 and 15 and pads 16 and 17. This particular construction and location is to give additional rigidity to body 10 and tends to retain the latter in the cylindrical configuration.

Positioned in each head 12 and 13 is a ring-shaped girder 27 and 28 that has welded thereto a central flange 29 and 30 which is in turn welded to heads 12 and 13 respectively. These ring girders 27 and 28 and flanges 29 and 30 overlie the extreme ends of subframes 14 and 15 and have for their purpose the preventing of inward crushing or bending of heads 12 and 13 due to roads and highways that tend to cause the trailer to bounce or otherwise be jostled about. It is a physical truism that a cylindrical-shaped body properly supported within and without may carry or haul a greater load and withstand a greater pressure than bodies constructed in other configurations. However, it is also a fact that if the cylindrical shape of the body is in any way caused to lose said shape the particular advantages thereof are readily lost. Therefore, it may be seen that girders 27 and 28 along with the flanges 29 and 30 prevent the distorting of the cylindrical configuration of body 10 by virtue of the fact that these said girders and flanges are strategically located relative to the areas of strain or damage or bending where such conditions are most likely to occur. Additionally, girders 27 and 28, along with flanges 29 and 30, cooperate with baffles 24, 25, and 26 to retain body 10 in its cylindrical configuration at the points and areas where strain is less likely to occur. The circular cross section gives greater section modulus, resulting in the cylindrical tank acting as a very strong beam. Thus, it is important to maintain the circular cross section with stiffeners such as girders 27 and 28, along with flanges 29 and 30 which cooperate with baffles 24, 25, and 26.

The pads 16 and 17 and subframes 14 and 15 are so designed and constructed as to distribute the force that may be applied thereto over a large area as distinguished from force that would be applied directly to a restricted area. Pads 16 and 17 in connection with subframes 14 and 15 transmit the force supplied thereto and distribute the same over the heads 12 and 13 and about the body 10. Upwardly extending arms 18, 19, 20, and 21, which partially embrace body 10, cooperate with subframes 14 and 15 and pads 16 and 17 in the respect just aforementioned.

Various changes may be made in the details of the construction without departing from the spirit and scope of the invention as defined by the appended claims.

I claim:

1. A mobile tank construction comprising front and rear pairs of ground wheels, subframes supported thereby, a horizontally disposed cylindrical tank connecting the subframes and constituting the sole connection therebetween, said tank having hemispherical end heads, and vertically disposed circular girders secured to the hemispherical end heads intermediate the ends thereof, said girders being disposed over the outer ends of the subframes.

2. A mobile tank construction comprising front and rear pairs of ground wheels, subframes supported thereby, a horizontally disposed cylindrical tank connecting the subframes and constituting the sole connection therebetween, said tank having hemispherical end heads, and vertically disposed circular girders secured to the hemispherical end heads intermediate the ends thereof, said girders being disposed over the outer ends of the subframes, said subframes having arms at the inner ends thereof embracing and secured to the cylindrical tank adjacent the ends thereof.

3. A mobile tank construction comprising front and rear pairs of ground wheels, subframes supported thereby, a horizontally disposed cylindrical tank connecting the subframes and constituting the sole connection therebetween, said tank having hemispherical end heads, and vertically disposed circular girders secured to the hemispherical end heads intermediate the ends thereof, said girders being disposed over the outer ends of the subframes, said subframes having arms at the inner ends thereof embracing and secured to the cylindrical tank adjacent the ends thereof, and baffles within the tank secured therein in vertical alignment with the arms.

References Cited in the file of this patent

UNITED STATES PATENTS

| | | |
|---|---|---|
| 1,081,032 | Evens | Dec. 9, 1913 |
| 1,462,347 | Kramer | July 17, 1923 |
| 1,674,918 | Pew | June 26, 1928 |
| 1,807,394 | Dunham | May 26, 1931 |
| 2,011,161 | Robinson, Sr. | Aug. 13, 1935 |
| 2,113,796 | Meyer | Apr. 12, 1938 |
| 2,163,387 | Thwaits | June 20, 1939 |
| 2,239,507 | Pierce | Apr. 22, 1941 |
| 2,532,854 | Plummer | Dec. 5, 1950 |
| 2,540,859 | Birkin | Feb. 6, 1951 |
| 2,606,039 | LaRue | Aug. 5, 1952 |

FOREIGN PATENTS

| | | |
|---|---|---|
| 533,628 | Germany | Sept. 24, 1931 |
| 328,136 | Italy | July 30, 1935 |
| 338,343 | Italy | Mar. 31, 1936 |